June 11, 1940.  M. J. PHILLIPS  2,204,048
VALVE
Original Filed March 7, 1939   3 Sheets-Sheet 1

Inventor
Michael J. Phillips
By Harrison Bates
Attorney

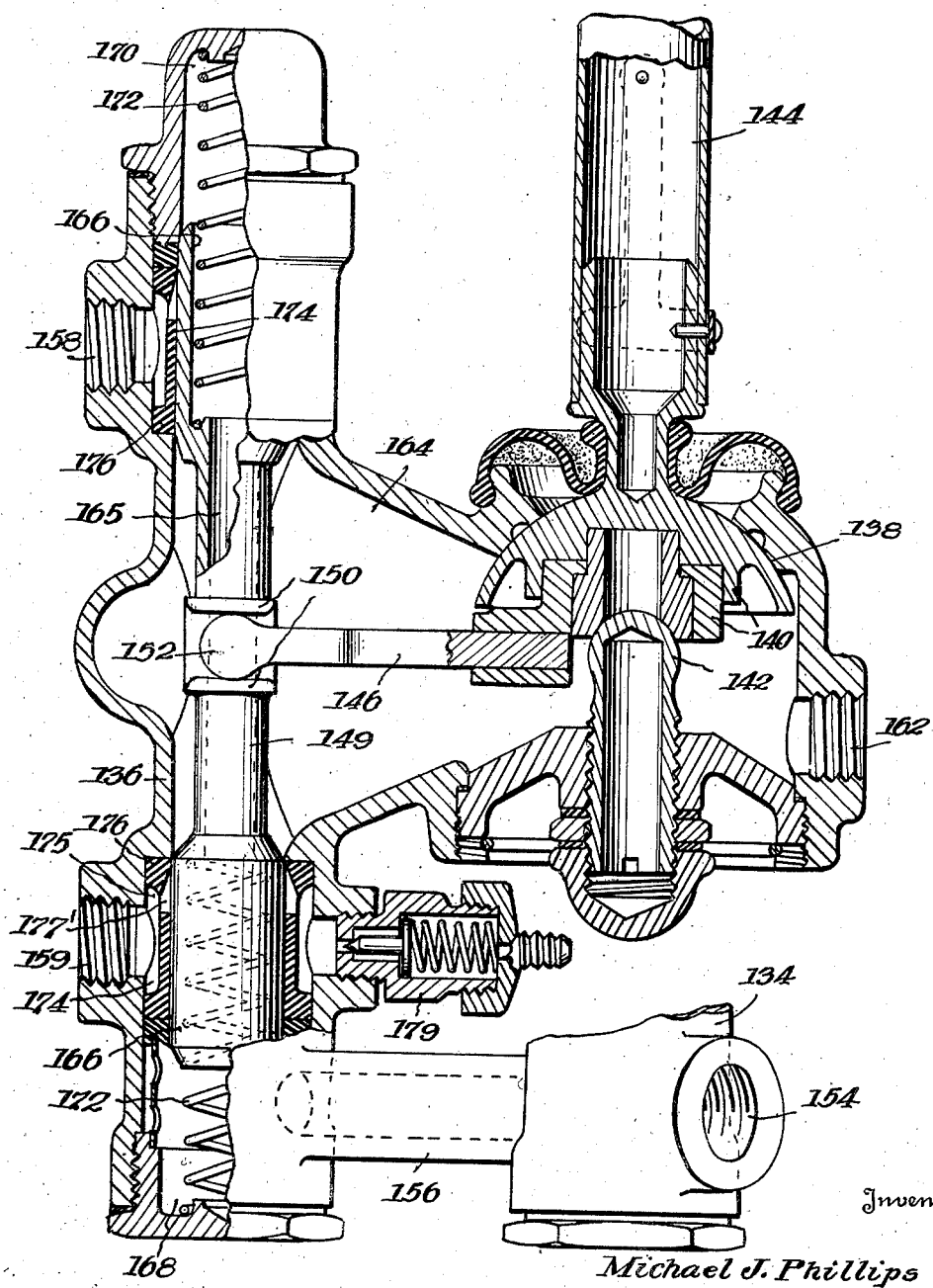

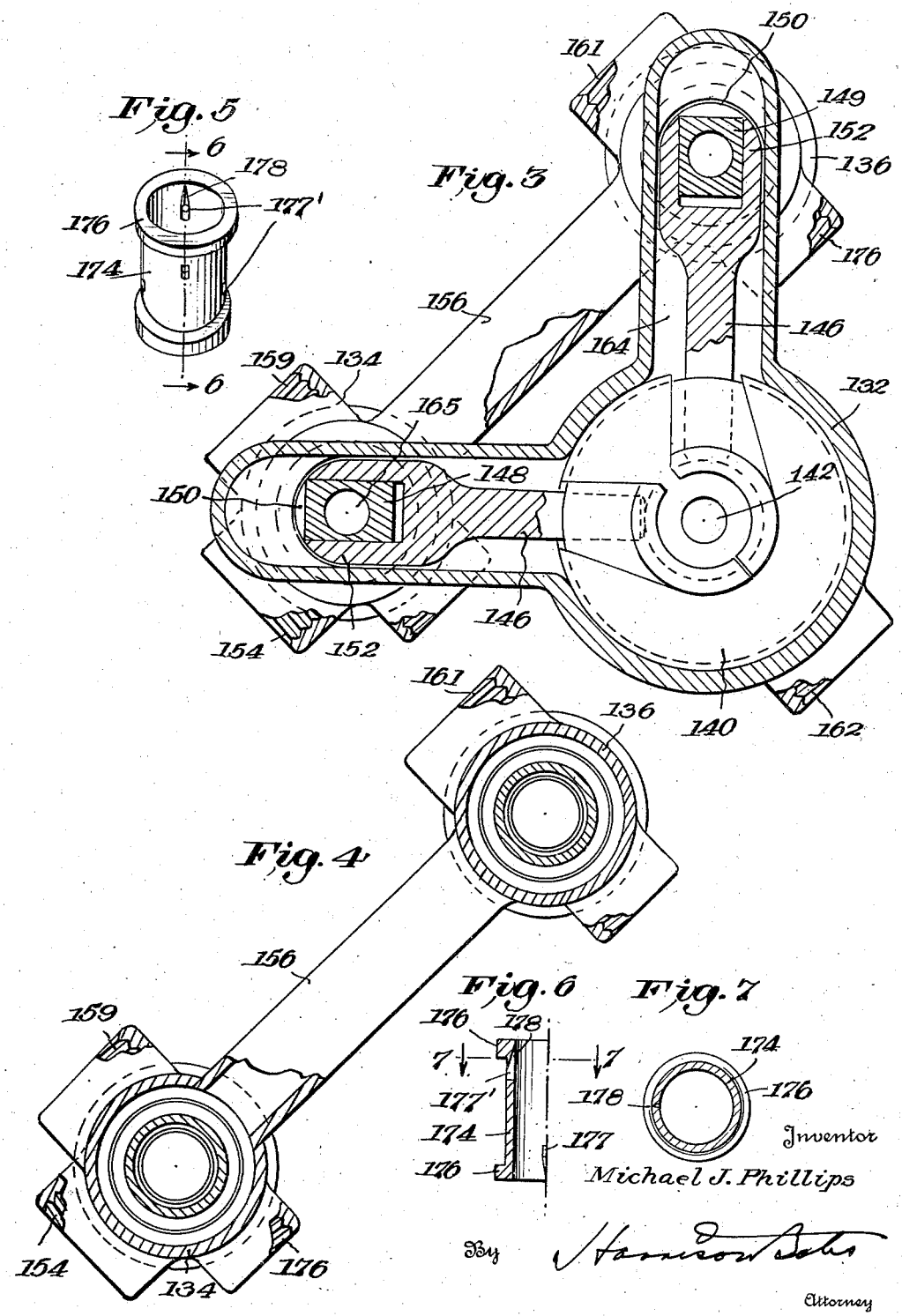

Patented June 11, 1940

2,204,048

UNITED STATES PATENT OFFICE 2,204,048

VALVE

Michael J. Phillips, Cleveland, Ohio, assignor to The Glenn L. Martin Company, Baltimore, Md.

Original application March 7, 1939, Serial No. 260,268. Divided and this application November 14, 1939, Serial No. 304,296

6 Claims. (Cl. 251—76)

This application is a division of my copending application Serial No. 260,268, filed March 7, 1939.

The invention relates to valves.

The object of the invention is to provide a novel valve for controlling the supply of pressure fluid which prevents shocks to motors operated thereby and permits slow and accurate maneuvering of such motors.

Other objects and advantages of the invention will appear more fully from the following description, particularly when taken in conjunction with the accompanying drawings, which form a part thereof.

In the drawings:

Fig. 1 shows the valve in side elevation;

Figs. 2, 3 and 4 are cross sections on the lines 2—2, 3—3 and 4—4 respectively of Fig. 1;

Fig. 5 is a perspective view of one of the sleeves which cooperates with the slide valves;

Fig. 6 is a cross section on the line 6—6 of Fig. 5;

Fig. 7 is a cross section on the line 7—7 of Fig. 6.

Figure 1:
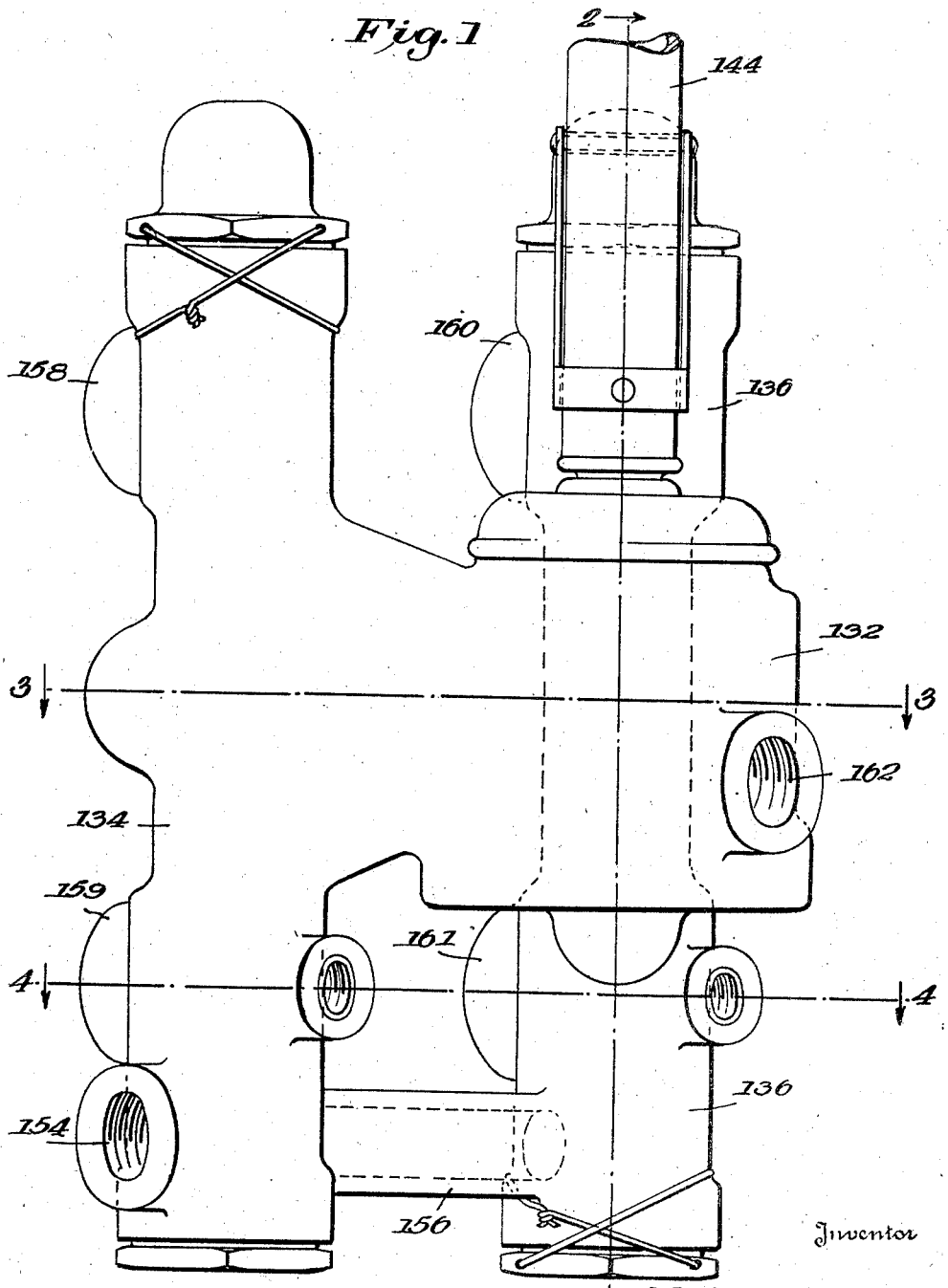

The valve is used for controlling the supply of fluid under pressure individually and simultaneously to two different motors. This mechanism is intended to be operated by a single stick similar to the ordinary joy stick of an aircraft.

The valve includes a casing having a main or fulcrum portion 132 and two regulating portions 134 and 136 for the two different motors respectively, these regulating portions being arranged in directions perpendicular to each other from the main portion 132. The main portion 132 includes a spherical seat 138 engaging the top surface of a ball joint 140, the bottom surface of this joint engaging another spherical portion 142. The ball joint is rigid with a control stick 144, so that this control stick can be swung in any direction.

Connected with the ball joint 140 are two arms 146 arranged at right angles to each other and extending to the regulating portions 134 and 136 respectively. The inner ends of these arms are round and are mounted in round sockets in member 140. Each of the regulating portions 134 and 136 includes a valve member composed of vertical rods 148, 149 respectively, each having spaced flanges 150 between which are engaged ball shaped portions 152 on the forked ends of levers 146. It is obvious that by tilting the stick in one direction, for example, up in Fig. 3, the rod 149 will be moved downwardly, without affecting the rod 148, while, on the other hand, by tilting the stick to the right the rod 148 may be moved up without affecting the rod 149. It is thus possible to control either of the valve members 148 and 149 independently, or to move them together by moving the stick at any desired angle.

Fluid such as oil under pressure is supplied in any suitable manner to an opening 154 in the bottom of member 134, which communicates through a passage 156 with the bottom of member 136. Oil under pressure is thus supplied to the bottom of each of these regulating devices. Each regulating device is intended to control one motor. Each is for this purpose provided with upper and lower outlets 158, 159 and 160, 161 respectively, so that as fluid is supplied to one or the other of these outlets it may return through the other. Thus the motors may be driven in either direction. The return flow of fluid from the control mechanism is permitted through an outlet 162 provided in the portion 132 and communicating with the central space 164 of the mechanism.

The valve members 148 and 149 are similar. Valve member 149 only will be described. The body of the valve member is provided with a longitudinal passage 165 running therethrough, and on its ends are hollow enlarged sleeve members 166. This provides communication between the bottom space 168 and the top space 170, so that pressure fluid is present in both of these chambers. Coil springs 172 within the chambers tend to hold the valve in central position.

The sleeve portions 166 slide in spaced metering sleeves 174 (see Figs. 5 to 7). These sleeves have flanges 176, forming therebetween spaces 175 communicating with the outlets 158 and 159. The sleeves 174 are provided at their outer ends with pressure supply apertures 177, and at their inner ends with discharge apertures 177'. The portions 178 of these openings adjacent the flanges 176 are of a tapering, V-shape, opening on the inner faces of the sleeves (see Figs. 6 and 7). It will be evident that when the valve 149 is moved downwardly, to a sufficient degree, it will open communication through apertures 177 of the upper sleeve 174 between the chamber 170 and the outlet 158. At the same time, the downward movement of the sleeve will open communication through aperture 177' of the lower sleeve 174 between the lower outlet 159 and the space 164 within the control mechanism. The passage will be small when the valve is moved slightly, because of the small cross section of the outer end of portion 178 of the opening. Thus pressure fluid will be supplied at a gradually increasing rate, preventing shocks to the motors and permitting slow and exact maneuvering thereof when the valve members are moved only by small amounts.

Fluid under pressure then flows, in the examples given, from inlet 156 through pipe 156, lower space 168, passage 164, upper space 176, aperture 177 and outlet 158 to a motor, while return fluid will flow from the aperture 159 through aperture 177' and space 164 to outlet 162.

A pressure relief valve mechanism 179 subject to changes in pressure caused by increase in temperature may be provided communicating with spaces 175 so that excess pressure will be relieved.

While I have described herein one embodiment of my invention, I wish it to be understood that I do not intend to limit myself thereby except within the scope of the appended claims.

I claim:

1. A control mechanism comprising a casing having two elongated control chambers, control valves slidable longitudinally in said control chambers, said control valves terminating short of at least one end of each of said chambers, whereby spaces are left in such ends of the chambers, inlet means into the spaces of each of the chambers to supply fluid under pressure thereto, a metering sleeve spaced inwardly from such ends of the chambers, said valve members having sleeve portions sliding with a tight fit in said metering sleeves, said metering sleeves having apertures therein, each of said apertures extending through the sleeve wall, whereby when the valve portions of said valve members are moved such apertures are gradually uncovered to permit the flow of fluid through the sleeve, passages connected to the openings in the sleeves, a control portion having an outlet therefrom, means connecting the central portions of each of said control chambers with the space within said control portion, a handle extending into said control portion, and two members extending at angles to each other connecting said handle to said valve members.

2. A control mechanism comprising a casing having two elongated substantially parallel control chambers, control valves slidable longitudinally in said control chambers, said control valves terminating short of the ends of said chambers, whereby spaces are left in the ends of the chambers, passages through said control valves connecting such spaces, means connecting one of the spaces of one of the chambers with one of the spaces of the other chamber, an inlet into one of the spaces of one of the chambers to supply fluid under pressure thereto, metering sleeves spaced inwardly from the outer ends of the chamber, said valve members having sleeve portions sliding with a tight fit in said metering sleeves, said metering sleeves having at opposite ends thereof apertures, each of said apertures extending through the sleeve wall, whereby when the valve portions of said valve members are moved such apertures are gradually uncovered to permit the flow of fluid through the sleeve, inlets and outlets connected to the openings in the sleeves, a control portion having an outlet therefrom, means connecting the central portions of each of said control chambers with the space within said control portion, a handle extending into said control portion, and two members extending at right angles to each other connecting said handle to said valve members.

3. A control mechanism comprising a casing having two elongated substantially parallel control chambers, control valves slidable longitudinally in said control chambers, said control valves terminating short of the ends of said chambers, whereby spaces are left in the ends of the chambers, passages through said control valves connecting such spaces, means connecting one of the spaces of one of the chambers with one of the spaces of the other chamber, an inlet into one of the spaces of one of the chambers to supply fluid under pressure thereto, metering sleeves spaced inwardly from the outer ends of the chamber, said valve members having sleeve portions sliding with a tight fit in said metering sleeves, said metering sleeves having at opposite ends thereof apertures, each of said apertures comprising a portion extending through the sleeve wall and a V-shaped portion of decreasing depth communicating with said first portion and extending towards the end of the sleeve, whereby when the valve portions of said valve members are moved such V-shaped portions are gradually uncovered to permit the flow of fluid through the sleeve, inlets and outlets connected to the openings in the sleeves, a control portion having an outlet therefrom, means connecting the central portions of each of said control chambers with the space within said control portion, a handle extending into said control portion, and two members extending at right angles to each other through said last connecting means connecting said handle to said valve members.

4. A control mechanism comprising a casing having an elongated control chamber, a control valve slidable longitudinally in said control chamber, said control valve terminating short of the ends of said chamber, whereby spaces are left in the ends of said chamber, a passage through said control valve connecting such spaces, coil springs arranged in such spaces and extending into such passage for normally centering said valve, an inlet into one of the spaces of the chamber to supply fluid under pressure thereto, metering sleeves spaced inwardly from the outer ends of the chamber, said valve member having sleeve portions sliding with a tight fit in said metering sleeves, said metering sleeves each having apertures therein, whereby when the valve portions of said valve member are moved such apertures are gradually uncovered to permit the flow of fluid through the sleeve, and inlets and outlets connected to the openings in the sleeves.

5. A control mechanism comprising a casing having an elongated control chamber, passage means connected to the central part of said chamber, a control valve slidable longitudinally in said control chamber, said control valve terminating short of the ends of said chamber, whereby spaces are left in the ends of the chamber, passage means into the spaces at the ends of the chamber, metering sleeves spaced inwardly from the outer ends of the chamber, said valve member having sleeve portions sliding with a tight fit in said metering sleeves, each of said metering sleeves having apertures adjacent the inner and outer ends thereof, each of said apertures extending throughout the sleeve wall, whereby when the valve portions of said valve member are moved the outer aperture of one sleeve is gradually uncovered to permit the flow of fluid through the sleeve and said aperture, and the inner aperture of the other sleeve is gradually uncovered to permit the flow of fluid through said aperture and the central part of the control chamber, and passage means connected to the apertures in the sleeves.

6. A control mechanism comprising a casing having an elongated control chamber, outlet means connected to the central part of said chamber, a control valve slidable longitudinally in said control chamber, said control valve terminating short of the ends of said chamber, whereby spaces are left in the ends of the chamber, a passage through said control valve connecting such spaces, an inlet into one of the spaces of the chamber to supply fluid under pressure thereto, metering sleeves spaced inwardly from the outer ends of the chamber, said valve member having sleeve portions sliding with a tight fit in said metering sleeves, said metering sleeves each having apertures adjacent its inner and outer ends, each of said apertures comprising a portion extending through the sleeve wall and a groove portion and extending towards the end of the sleeve, whereby when the valve portions of said valve member are moved one of the outer groove portions is gradually uncovered to permit the flow of fluid through the sleeve and the corresponding aperture and the central part of the control chamber, and inlets and outlets connected to the apertures in the sleeves.

MICHAEL J. PHILLIPS.